(12) United States Patent
Judge et al.

(10) Patent No.: US 6,430,564 B1
(45) Date of Patent: Aug. 6, 2002

(54) JAVA DATA MANAGER FOR EMBEDDED DEVICE

(75) Inventors: Frank P. Judge, Ft. Collins; Raymond C. Cribar, Loveland, both of CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/259,617

(22) Filed: Mar. 1, 1999

(51) Int. Cl.[7] .............................................. G06F 17/00

(52) U.S. Cl. ................... 707/100; 707/102; 707/103 R; 709/106

(58) Field of Search ................................ 709/200–203, 709/300–332, 1–108; 211/100; 701/36, 33, 210; 714/39, 725, 734; 713/340, 176–180; 380/30; 707/1–206; 712/32–36

(56) References Cited

U.S. PATENT DOCUMENTS

| | | | | | |
|---|---|---|---|---|---|
| 5,790,669 A | * | 8/1998 | Miller et al. | ................ | 713/177 |
| 5,991,795 A | * | 11/1999 | Howard et al. | ............. | 709/201 |
| 6,170,007 B1 | * | 1/2001 | Venkratraman et al. | ..... | 709/201 |
| 6,182,247 B1 | * | 1/2001 | Herrmann et al. | ............ | 714/39 |
| 6,185,491 B1 | * | 2/2001 | Gray et al. | ................... | 701/36 |

OTHER PUBLICATIONS

Gosling et al., "The Java Language Specification", pp. 218–219, 558–560, Aug. 1996.*
Kastner et al., "A new approach for Java in embedded networks", Factory Communications Systems, Proceedings, 2000 IEEE International Workshop on, pp. 19–26, Sep. 2000.*
Nieva et al., "Jini technology applied to ralyway systems", Distributed Objects and Applications, Proceedings DOA International Symposium on, pp. 251–259, Sep. 2000.*
Schimkat et al., "Scalability and interoperability in service–centric architecture for the Web", Database and Expert Systems Applications, 2000 Proceedings, 11th International Workshop on, pp. 51–57, Sep. 2000.*

* cited by examiner

*Primary Examiner*—David Jung

(57) ABSTRACT

A data manager manages global data within a Java Virtual Machine (JVM) installed and running in an embedded device. The data manager maintains a data class list that stores data class identifiers associated with each data class object currently loaded and cached in a data cache in the embedded device. The data manager specifies a universal data manager API, which includes a data class loader method, a data object creation method, get and put data methods which allow manipulation of existing data objects, and an unload method which unloads cached data objects from the embedded device. The data manager comprises or is responsive to a memory management handler which detects low- or out-of-memory conditions and which selects one or more data class objects to be unloaded from the data cache.

17 Claims, 5 Drawing Sheets

JAVA DATA MANAGER FOR EMBEDDED DEVICE

BACKGROUND OF THE INVENTION

In the embedded device environment, a hardware independent processor such as a Java Virtual Machine is often installed on the device to allow a program to be downloaded and executed on the device. Such a system allows a program written in a hardware independent language such as Sun MicroSystem's Java® to be downloaded to any hardware supporting the Java® environment in order to customize it for a particular use. This customization is often referred to as the "personality" of the device. Multiple applications may be running in concert within an embedded device to define the device's personality. In this way the device can dynamically be made to function in different unique ways. For example, an embedded device such as a refrigerator may be customized to automatically track its contents. Just as the types of food and naming conventions of similar foods may differ from culture to culture, the embedded device refrigerator may be customized to the particular culture of the users by downloading a new personality describing the food types and naming conventions to the Java enabled embedded refrigerator device.

In the embedded device domain, a hardware independent processor such as a Java® Virtual Machine is installed on the device to allow applications to be downloaded and executed on the device. In order for Java to succeed in the embedded device market, Java programs must be able to execute in a memory constrained environment. Typical embedded devices contain 1 megabyte of memory or less, whereas typical embedded Java environments for these devices are 500K or greater in size. This leaves less than 500K of free memory for the embedded device's firmware and for Java programs running on the device. In most cases, embedded Java programs create or use data objects to be shared with other programs on the device, or programs running on other network capable devices. In a memory constrained environment, creating these global data objects using just the Java language capabilities is a daunting task.

The Java language was originally developed for the embedded device environment, allowing a program to execute on any hardware supporting the Java environment. Many Java enabled devices are network ready, supporting Java programs collecting and analyzing data on the device. The device data is then shared with other Java programs on the device, or with other devices on the network. The main problem with implementing this type of Java system is the memory constraints of embedded devices. The Java language does not directly support managing of global data objects within a memory constrained environment. The Java language also does not directly support the loading of data objects to remote devices, thereby allowing more memory to be free on the device for program use.

Currently, there are no known products implementing a standard way of easily sharing global data objects between Java programs on a device in a memory constrained fashion. There are also no known products allowing Java programs to unload data objects onto another device, and reload them onto the original device when needed.

Accordingly, a need exists for a method for allowing data to be stored on other network devices, and then dynamically loaded into the device when needed. A need also exists for a method for allowing data caching beyond the life of a program, thereby allowing other programs to use the same data objects. It would be desirable if the mechanism providing this functionality could be used by all Java capable devices, and did not require a network interface for simple sharing of data between applications on the same device.

SUMMARY OF THE INVENTION

The present invention is a novel method and mechanism for allowing data to be stored on remote network devices and dynamically loaded into an embedded device when needed by the embedded device. The mechanism of the invention provides data caching beyond the life of a program, allowing other programs to use the same data objects. The mechanism of the invention can be used by all Java capable devices, and does not require a network interface for simple sharing of data between applications on the same embedded device.

A Java based Data Manager is provided which allows applications to create global data objects in a memory constrained environment. The Data Manager can load Java classes for use by data objects, create the objects, cache the objects, and allow applications to retrieve and store the data objects. The Data Manager performs all these functions under tight memory constraints. When memory on the embedded device becomes full, the Data Manager removes items from its cache to free up memory using a configurable algorithm to determine which items should be removed. Because the Data Manager begins executing when the first Java program runs, the Data Manager can outlive all other programs, and thereby act as a data repository for Java programs. The Data Manager supports the ability to store object data on remote systems, and then retrieve the data at a later time when it is needed. The Data Manager supports API's to query which objects and classes are being maintained in its caches.

BRIEF DESCRIPTION OF THE DRAWING

The invention will be better understood from a reading of the following detailed description taken in conjunction with the drawing in which like reference designators are used to designate like elements, and in which.

DETAILED DESCRIPTION

A novel Data Manager for an embedded device is described in detail hereinafter. Although the invention is described in the context of a Java® environment installed on the embedded device, it will be appreciated by those skilled in the art that the principles of the invention extend to any embedded device comprising a hardware independent processor for processing code written in a hardware independent language.

Figure 1:
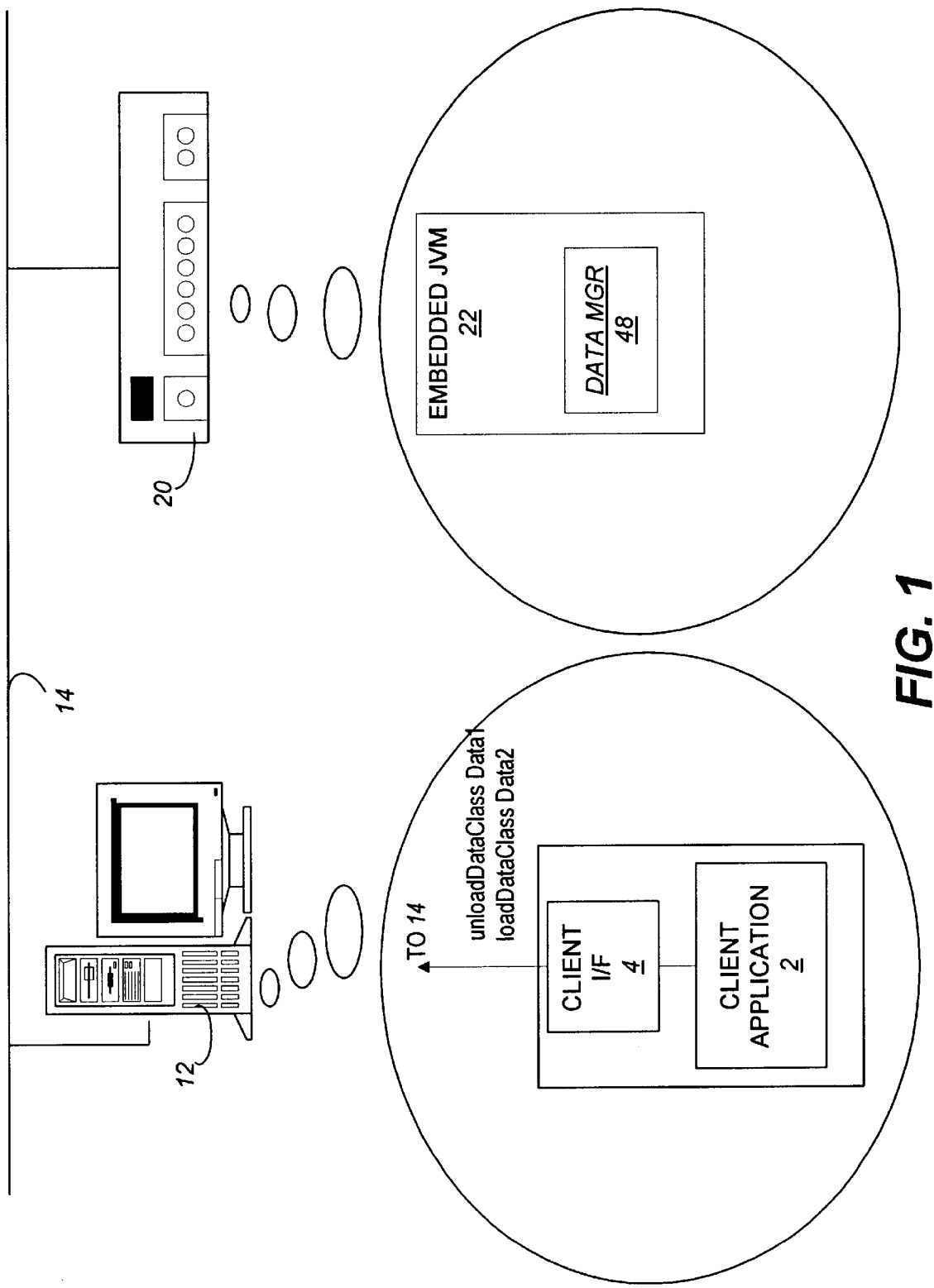
FIG. 1 is a system diagram of a network system in which the invention operates.

Turning now to FIG. 1, there is illustrated a networked system 10 comprising a computer system 12 in communication with an embedded device 20 over a network 14. Network 14 may be a conventional land-linked wired network such as a LAN or WAN, or may be a wireless network, or any combination thereof.

Computer system 12 in this system operates as a client, executing a client application 2 that interfaces with server devices (e.g., embedded device 20) over network 14 via a client interface 4. In this example, client application 2 sends requests (e.g., unloadDataClass Data1, loadDataClass Data2) to embedded device 20, which operates as a server to service the requests. Client application 2 may execute in its own environment on computer system 12, or alternatively within a Java-enabled Web browser (not shown) that contains its own Java Virtual Machine (JVM) (not shown). The web browser interprets Web documents with embedded Java applets that specify the location of the data class file. The web browser starts up its JVM and passes the location of the data class file to its class loader. Each data class file knows the names of any additional class files that it requires. These additional class files may come from the network 14 (i.e., other machines coupled to the network 14) or the client computer system 12.

Figure 2:
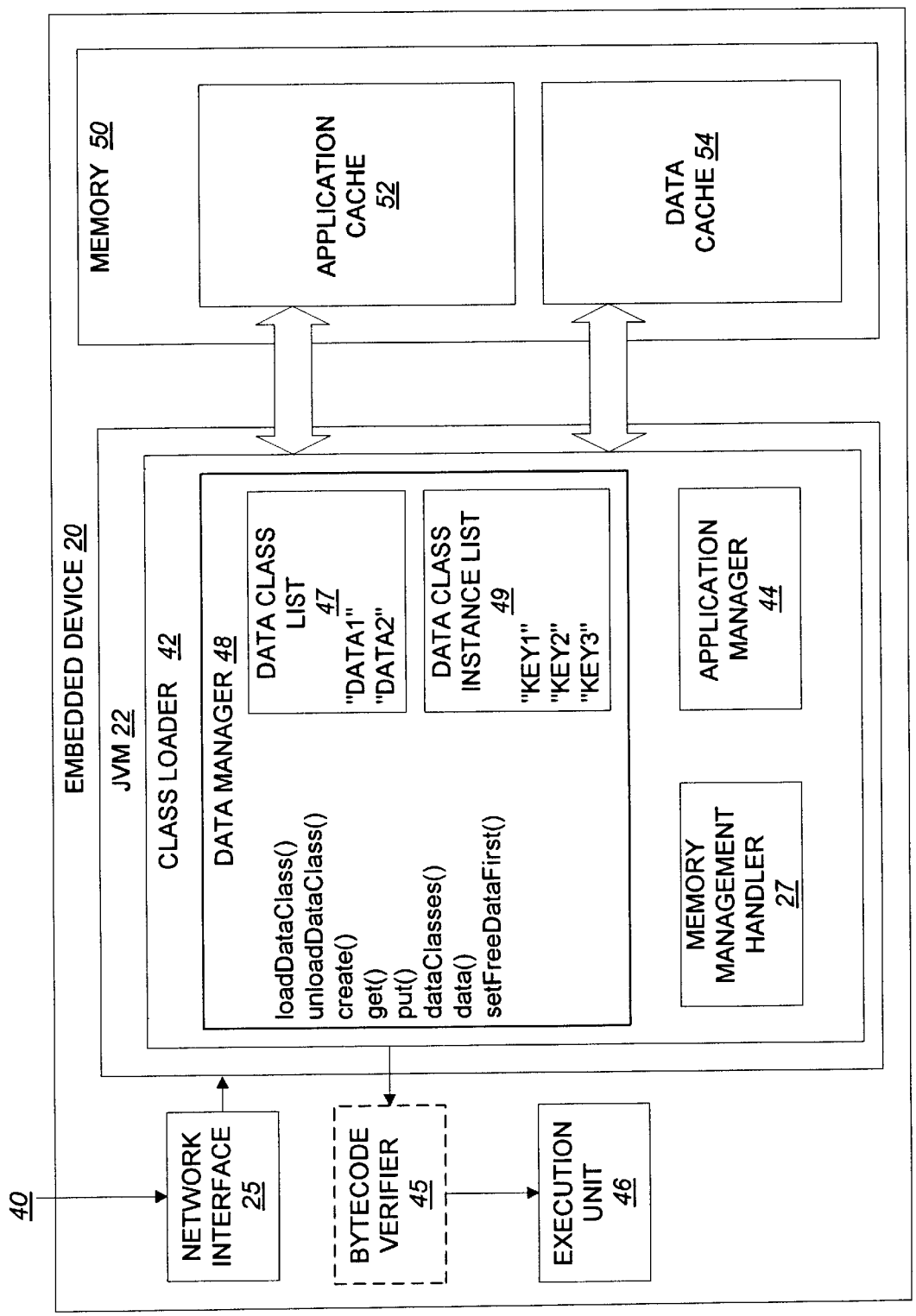
FIG. 2 is a block diagram of an embedded device in which the invention is implemented.

Embedded device 20 is a Java enabled device with a Java Virtual Machine (JVM) 22 installed on it. FIG. 2 is a block diagram illustrating a preferred embodiment of an embedded device 20 in more detail. In this embodiment, embedded device 20 comprises a JVM 22, a memory 50, and a network interface 25. JVM 22 comprises a class loader 42 and an execution unit 46. Preferably, JVM 22 also comprises a bytecode verifier 44, although in some memory-constrained devices this may not be implemented. Class loader 42 is preferably implemented with an Application Manager 44, which is responsible for the downloading, execution, and caching of other Java based programs from the network 14. An exemplary Application Manager 44 is described in copending U.S. Pat. application, Ser. No. 09/259,616, which is incorporated herein by reference. Data manager 48 is responsible for the loading and unloading of data classes and creating, keeping track of, and caching data objects. Memory 50 comprises a data cache 54 and preferably an application cache 52. Data cache 54 is managed by data manager 48 and application cache 52 is managed by application manager 44. When JVM 22 begins executing on embedded device 20, it creates objects for and begins executing Application Manager 44 and Data Manager 48.

Figure 3:
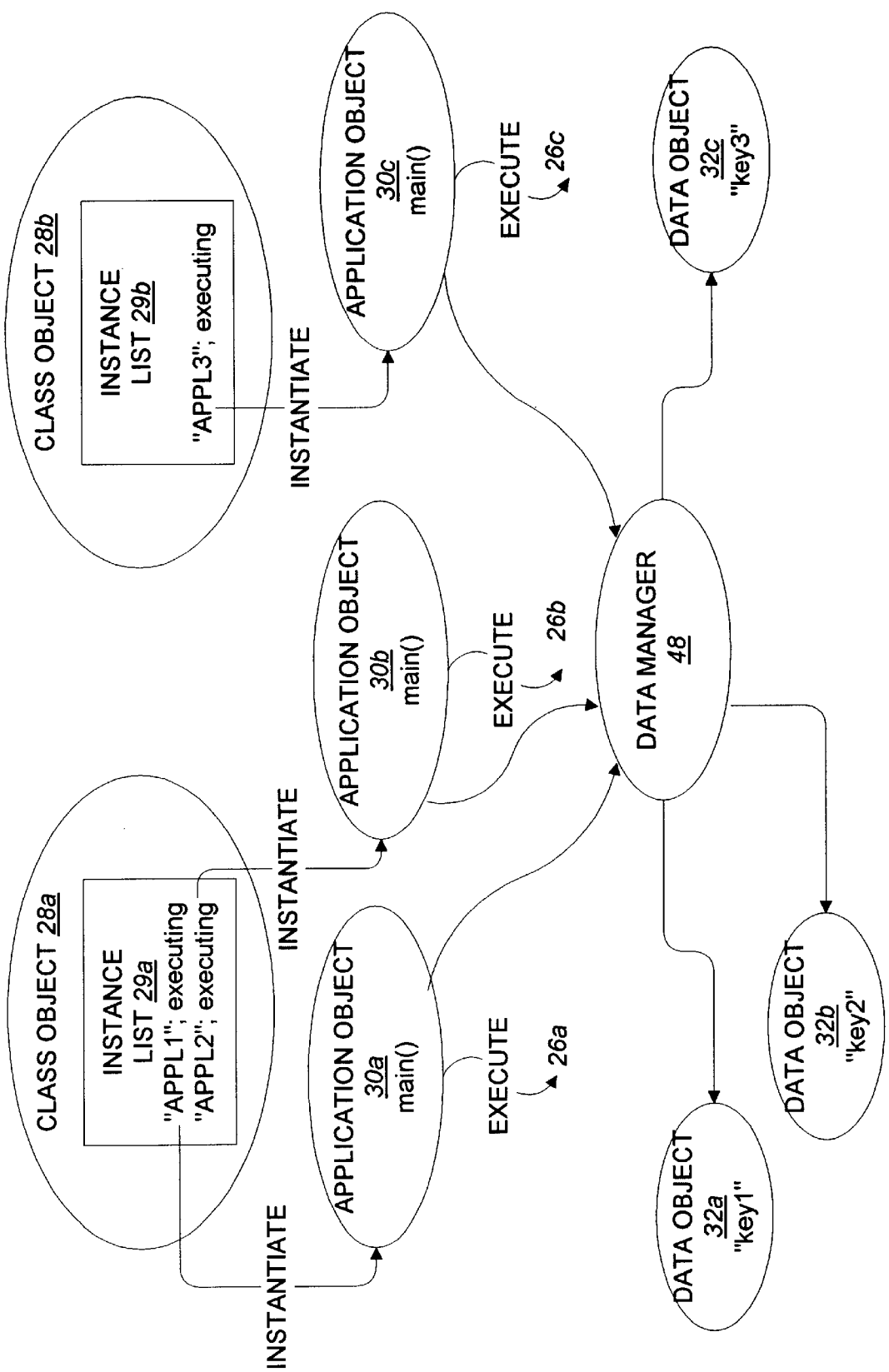
FIG. 3 is a flow diagram illustrating how an application is brought to life.

FIG. 3 illustrates how an application 26a, 26b, 26c is brought to life. As illustrated, this is accomplished by instantiating an application's Java class 28a, 28b, creating an instance object 30a, 30b, 30c of the class 28a, 28b, and then calling a main method on the object 30a, 30b, 30c to run the application 26a, 26b, 26c. Multiple instances of the same application may be executed simultaneously by creating multiple instances of the same Java® class. For example, as shown in FIG. 3, objects 30a and 30b are instances of the same class 28a, whereas object 30c is an instance of a different class 28b. Accordingly, applications 26a and 26b are different instances of the same application which may run simultaneously, while application 26c is an entirely different application.

Application manager 44 provides downloading, starting, stopping, querying, and memory management capabilities. In order to provide these capabilities over network 14, embedded device 20 includes a network interface 25 implementing a network protocol 48, such as Java® Remote Method Invocation (RMI) protocol, HyperText Transport Protocol (HTTP) for Web hosted requests, or an application level protocol over TCP/IP sockets, which allows clients 12 to send requests to the Application manager 44 of the embedded device 20. In the preferred embodiment, network interface 25 speaks to Application manager 44 using a universal Java language Application Program Interface (API) specified by Application manager 44. The universal API provides remote devices such as computer system 12 with the ability to specify the desired management of the device 20. Appendix A is a Java™ code listing of the APIs of an exemplary embodiment of Application Manager 44 in accordance with the invention. A complete description of the Application Manager 44 and defined API used in the illustrative embodiment of the invention may be found in co-pending U.S. Patent application Ser. No. 09/259,616, and is incorporated herein by reference.

Executing applications, including both local applications executing within the embedded device 20 and remote applications communicating with the embedded device 20 over network 14, interact with data objects via Data Manager 48. For illustration, FIG. 3 shows executing applications 26a and 26b respectively interacting, through Data Manager 48, with data objects 32a and 32b. Similarly, executing application 26c interacts via Data Manager 48 with data objects 32a, 32b, and 32c.

Data Manager 48 is responsible for loading and unloading classes, creating instances of classes, providing access to instances of data classes, and responding to queries regarding the data classes and instances currently managed by the Data Manager 48. Data manager 48 maintains a data class list 47 and a data class instance list 49. Lists 47 and 49 may be maintained as a single list implemented in a single hashtable, keyed either by data class name or by instance label. Alternatively, lists 47 and 49 may be implemented as separate hashtables, as shown in FIG. 2. In yet another embodiment, data class instance list 49 may be implemented as a separate list within each data class object as shown in FIG. 3. In the preferred embodiment, Data Manager 48 is implemented as an object which provides a universal Java language Data Manager Application Program Interface (API). The universal Data Manager API provides both locally executing and remotely executing applications with the ability to manage and access the currently loaded data in embedded device 20. Appendix B is a Java® code listing of the APIs of an exemplary embodiment of Data Manager 48 in accordance with the invention.

As shown in Appendix B, Data Manager API includes functionality for data class loading and unloading via the loadDataClass and unloadDataClass methods. Method loadDataClass loads a data class by the name of "dataName" having a structure of a class identified by a "className". In the preferred embodiment, a "mainClass" argument is specified to indicate whether the class implements a main ( ) function which is called to instantiate an instance of the data class. A "classData" argument is passed which contains a byte array of the class data itself. The Data Manager receives it as an array of bytes. When a data class "dataName" is loaded, a class object having a structure defined by a class identified by "className" is created, and its main ( ) method, if it exists, is executed. If a main ( ) method does not exist, then the design of Data Manager 48 must include means for determining the name of the method to call when the class object is created. This may, for example, be accomplished via the Java® reflection method. Upon creation of the data class object, the data class object is added to the data cache 54 and the name of the data class "dataName" is added to a data class list 47 maintained by Data Manager 48.

When a data class is requested or selected to be unloaded from data cache 54, method unloadDataClass is invoked. Method unloadDataClass unloads a data class by the name of "dataName" by removing the data class object and all instances of the data class object from the data cache 54.

Upon removal of a data class object from the data cache 54, the name of the data class "dataName" is also removed from the data class list 47 maintained by Data Manager 48. In addition, all instance identifiers are removed from a data class instance list 49 maintained by Data Manager 48.

Data Manager API also includes functionality for creating instances of managed data classes via the creates method. The create ( ) method accepts the name of a class "c" and an object label "key", and instantiates a data object of class type "c". The newly created data object implements a "DataContract" interface, also specified in Appendix B, which provides and interface which allows the Data Manager 48 to allocate an appropriate amount of memory, properly initialize the object, and safely clean up open resources if and when the data object is deleted. The "key" label is used as a handle to the newly created data object and is added to the data class instance list 49 maintained by Data Manager 48.

Read and write access to existing data objects is provided via the get ( ) and put ( ) methods. Method get ( ) takes a data object label "key" and returns requested data from the data object identified by "key". Method put ( ) takes a data object label "key" and a value of class DataContract, and sets the values of the data object identified by label "key".

Data Manager API also provides query functionality to allow local and remote applications obtain a list of the currently managed data classes and instances of data classes. Method dataClasses ( ) returns a list of class names of the classes that are currently managed by Data Manager 48. Method data ( ) returns a list of instance labels of data objects that have been created and are currently managed by Data Manager 48.

When creating a data object, Data Manager 48 preferably caches the data object 32a, 32b, 32c by default in the data cache 54, and destroys the data object 32a, 32b, 32c only when explicitly requested using the unloadDataClass ( ) method or when the memory management handler 27 selects the data object 32a, 32b, 32c to be unloaded as a result of a low- or no-memory condition (e.g., OutOfMemoryError exception). In the preferred embodiment, the order in which currently loaded data classes are unloaded by the memory management handler 27 is set using the setFreeDataFirst ( ) method of the Data Manager 48. The setFreeDataFirst ( ) method allows a client to set or change the order in which data classes and objects are unloaded in case of a low- or no-memory condition. This may be accomplished in any of several ways, including by adding an unload priority field to each entry in the application list which indicates the ranking of the application for unloading the class. By caching the data class, the Data Manager 48 maintains a reference to the data class, thereby forcing the Java Virtual Machine 22 not to garbage collect the data object 32a, 32b, 32c. The data object 32a, 32b, 32c can then be accessed and manipulated by applications 26a, 26b, 26c, regardless of whether the application itself created the object as long as the application 26a, 26b, 26c knows the handle of the object. This allows data objects 32a, 32b, 32c to be created by one application and used by other applications, regardless of whether the application that created the data object remains loaded and running in the JVM 22. Thus, in low-memory situations, application classes and objects can be loaded and unloaded as necessary to operate within the low-memory environment, while the data classes and data objects created and manipulated by the various applications can live beyond the lifetime of the creating applications to be shared by other later executing applications.

Figure 4:
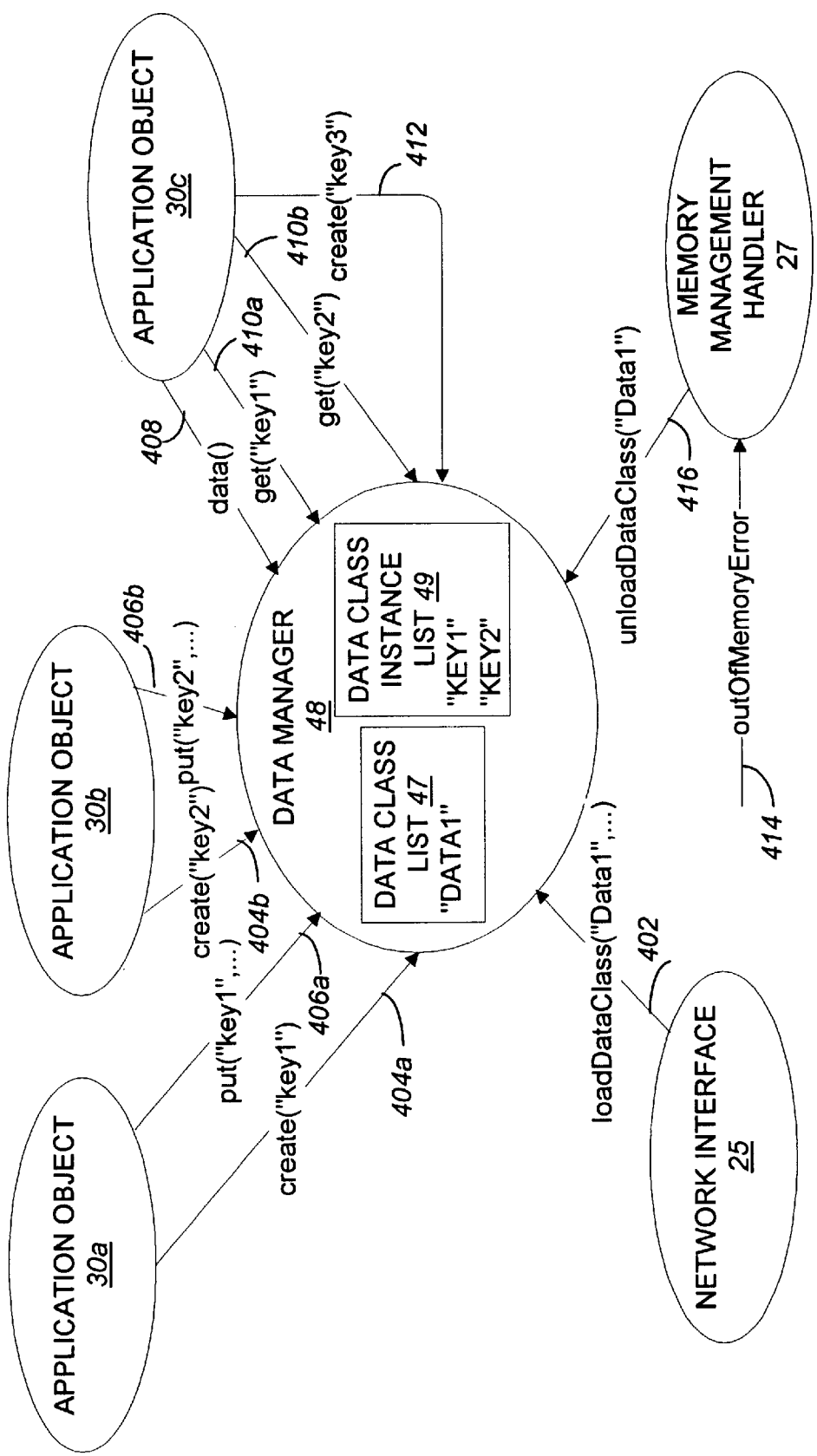
FIG. 4 is a communication diagram illustrating an example operation of a Data Manager implemented in accordance with the invention.

FIG. 4 is a communication diagram illustrating an example operation of Data Manager 48. As shown, all creation, access to, and removal of data classes and objects, whether at the request of executing applications 30a, 30b, 30c, network 14, or memory manager handler 27, are performed through Data Manager 48. In the example shown in FIG. 4, a data class called "DATA1" is loaded 402 into the embedded device 20 from the network 14. Executing application 30a creates 404a an instance of data class DATA1 called "key1", and then sets 406a its value. Executing application 30b similarly creates 404b an instance of data class DATA1 called "key2", and sets 406b its value. Executing application 30c obtains 408 a list of instances of data objects managed by Data Manager 48 and then accesses 410a, 410b the data objects of class DATA1 created by applications 30a and 30b. Because the data objects are cached by Data Manager 48 in data cache 54, applications 30a and 30b that created data objects "key1" and "key2" need not actually be execuring at the time that application 30c accesses 410a, 410b the data objects "key1" and "key2". Accordingly, Data Manager 48 allows data objects to survive the lifetime of their creating application, thereby providing a mechanism for allowing data sharing in a memory-constrained embedded device 20 by allowing the creating applications to be unloaded from memory 50 to free up memory for another application to be loaded, or for more data "key3" created 414 by other currently executing applications 30c. In the example of FIG. 4, the request to create 414 data object "key3" results in an OutOfMemoryError exception, signaling that not enough free memory exists in the data cache 54 to accommodate the creation and caching of the requested new object.

JVM 22 attempts to have applications 26a, 26b, 26c continue to execute in low- or no-memory situations. If, during the execution of an application 26a, 26b, 26c, the JVM 22 runs out of memory, an OutOfMemoryError error is generated. JVM 22 includes a memory management handler 27 which handles low- or no-memory conditions. In the preferred embodiment, memory management handler 27 is triggered into action by the occurrence of an OutOfMemoryError generated by the JVM 22.

In one embodiment, memory management handler 27 reacts by judiciously dumping application and/or data class objects and or application and/or data objects from memory 50. In the preferred embodiment, the order for unloading cached objects may be set dynamically using the setFreeAppsFirst( ) method of Application Manager 44 and setFreeDataFirst( ) method of DataMgr 48. Alternatively, the order is determined according to a predetermined algorithm coded within the memory management handler 27 itself. By calling the Java® Runtime.gc( ) method, Application Manager 44 and Data Manager 48 are able to inform the JVM 22 that unloaded class objects and instances of those class objects in a given cache 52 or 54 are available to be reclaimed. The unloading of class objects from a cache 52 or 54 forces any instances of those classes to be unloaded as well.

Application manager 44 and Data Manager 48 preferably provide memory management functionality. In one embodiment, Application manager 44 references class objects 28a, 28b and application objects 30a, 30b, 30c in application cache 52, and Data manager 48 references global data classes and global data objects 32a, 32b, 32c in data cache 54, thereby ensuring that these objects are not garbage collected.

In an alternative embodiment, memory management handler 27 continuously monitors the free memory level, and in times of low- or no-free memory, removes objects from its caches 52, 54 and triggers garbage collection to free up more memory as needed. As previously described, garbage collection is triggered by calling the Java® Runtime.gc( ) method after removing items from the application cache 52 or data cache 54. A choice must be made when implementing an memory management handler 27 as to how it manages the memory 50 in low memory situations. One choice is which cache, application cache 52 or data cache 54, is to have items removed from it first when low free memory occurs. In most cases it may be easier to remove application objects 30a, 30b, 30c and associated class objects 28a, 28b, and re-download them as needed. This decision is predicated on the long amount of time it may take to recreate global data.

Application and global data objects are preferably designed to be as separate as possible for the caching scheme to work correctly. If a global data class 32a, 32b, 32c is referenced as a member of an application class object 28a, 28b, then unreferencing the data class 32a, 32b, 32c will do nothing to free up memory unless the class object 28a, 28b is also unreferenced. The reverse case of a global data class 32a, 32b, 32creferencing an application class object 28a, 28b also causes the same result. Application class objects 28a, 28b should only reference global data classes 32a, 32b, 32c in methods, not in class members. Preferably, global data objects 32a, 32b, 32c never reference application class objects 28a, 28b.

Figure 5:
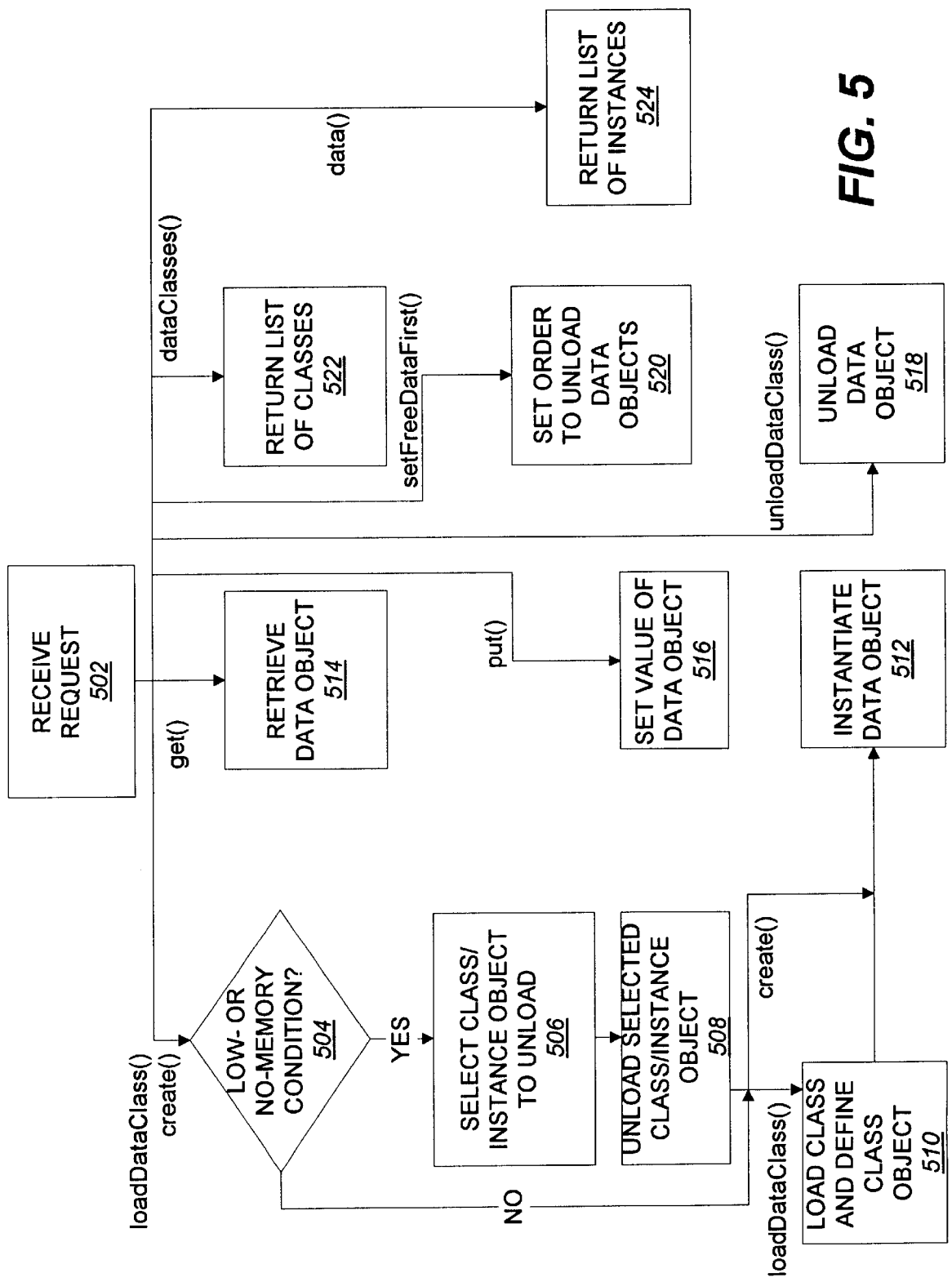
FIG. 5 is a class diagram of one implementation of an application manager implemented in accordance with the invention.

FIG. 5 is an operational flow diagram illustrating the functionality of the Data Manager 48 of the invention. Data manager 48 receives 402 a request from either a local application executing on the embedded device 20, a remote application executing on a system connected to the network 14, or from an object within the JVM 22 such as memory manager handler 27. If the execution of the request would result in the use of free memory (e.g., loadDataClass( ), create( ), a determination 504 is made as to whether the execution of the received request would result in a low- or no-memory condition. If so, application or data class object(s) and/or application or data object(s) are selected 506 for unloading from memory 50. The selected object(s) are then unloaded 508 from the appropriate cache 52 or 54 in memory 50. If the received request is a loadDataClass( ) request, a data class object is loaded from the network 14 and defined 510. A data object 32a, 32b, 32c is instantiated 512 and the request is complete. If the request is a get( ) request, the application is retrieved 514 from the requested data object 32a, 32b, 32c. If the request is a put( ) request, the value(s) in the requested data object 32a, 32b, 32c, are set 516. If the request is an unloadDataClass( ) request, the requested data class object is unloaded 518 from the data cache 54. If the request is a setFreeDataFirst( ) request, the order in which data classes and instances of those data classes 32a, 32b, 32c are selected for unloading upon the detection of a low- or no-memory condition is set 522. If the request is a query for the managed data classes dataClasses( ), the string list of managed data classes is returned 514. If the requested is a query for the managed data objects (i.e., instances of data classes), the string list of managed data objects is returned 526.

When it is determined 504 that data class objects or instances of data objects are to be unloaded due to a low- or no-memory situation, in the illustrative embodiment Data Manager 48 removes references to the objects that are chosen to be unloaded and causes the unreferenced objects to be removed from the data cache 54 by calling the Java® Runtime.gc( ) method. As previously described, only unreferenced classes are removed from the cache 54 because only unreferenced classes can be garbage collected by the Java® Runtime.gc( ) method.

As described in detail above, the Data Manager 48 of the invention allows caching of data classes and data objects in data cache 54 in memory 50, even after the creating application has terminated and/or been unloaded. An illustrative example of the utility of the invention exists in the electronic test domain. The first execution of an application could save setup information which allow future runs of the application to execute faster. In this example, Data Manager 48 could cache test system calibration information. Again, by caching the test system calibration information in data cache 54, Data Manager 48 maintains a reference to the data, thereby forcing the Java Virtual Machine 22 not to garbage collect the data. Accordingly, data caching in this manner allows information to be saved for subsequent runs of the same or different application.

As described in detail above, the present invention provides a data manager and API specification which runs within a Java Virtual Machine that is intended for use in electronics devices or appliances and in other embedded systems having environments with limited memory and or resource constraints. The invention provides the flexibility to cache global data for future runs when memory resources become constrained in order to free up memory for higher-priority applications.

Although the invention has been described in terms of the illustrative embodiments, it will be appreciated by those skilled in the art that various changes and modifications may be made to the illustrative embodiments without departing from the spirit or scope of the invention. It is intended that the scope of the invention not be limited in any way to the illustrative embodiment shown and described but that the invention be limited only by the claims appended hereto.

---

APPENDIX A

Java Application Manager API
import java.io.IOException;
public interface ApplMgr
{
    // Application centric methods
    public String[] applClasses() throws IOException;
    public String[] applications() throws IOException;
    public String[] applInstances() throws IOException;
    public void loadApplClass( String applName, String className,
              boolean mainClass, byte classData[])
              throws IOException;
    public String initAppl( String applName ) throws IOException;
    // Must be a MAIN class to work
    public String loadAndInit( String applName, String className,
              byte classData[] ) throws IOException;

APPENDIX A-continued

```
    public String startAppl( String applName, String applId ) throws IOException;
    public void stop Appl( String applName, String applId ) throws IOException;
    public void unloadAppl( String applName ) throws IOException;
    // Memory API's
    public long free Memory() throws IOException;
    public long total Memory() throws IOException;
    public double getFreeMemoryLimit() throws IOException;
    public void setFreeMemoryLimit( double percent ) throws IOException;
    public boolean getFreeAppsFirstPolicy() throws IOException;;
    public void setFreeAppsFirst( boolean val ) throws IOException;;
} // end interface ApplMgr
```

APPENDIX B

```
import java.io.IOException;
public interface DataMgr
{
    public DataContract create( Class c, Object key );
    public String[] data() throws IOException;
    public DataContract get( Object key );
    public void put( Object key, DataContract value );
    public String[] dataClasses();
    public void loadDataClass( String dataName, String className,
                    boolean mainClass, byte classData[] );
    public void unloadDataClass( String dataName );
    /* setFreeDataFirst() method
     * Allows a client to set or change the order in which data classes and
     * objects are unloaded in case of a low- or no-memory condition.
} // end DataMgr interface
public interface DataContract
{
/* *** Must also implement a public no arg default ctor. */
/* init()
 * Called to initialize the data object, which may require retrieving data from   * a
Database or other source
*/
    public void init( Object key );
/* memSize()
 * Returns the amount of memory that is needed to create an object of
 * this type
 */
public long memSize();
/* delete()
 * Called by data manager when freeing up memory to clean up any open   * resources. */
public void delete();
/* free-memory()
 * Returns the amount of free memory that is free for data manager to
 * allocate objects from. */
public long free-memory()
} // end DataContract
```

What is claimed is:

1. A data manager which manages global data in an embedded device, said embedded device comprising a hardware independent processor which processes code written in a hardware independent language, said hardware independent processor installed and running on said embedded device, an interface for communicating with a client, and a data cache for storing said global data, comprising:

a data class list having entries each entry comprising a data class identifier which identifies a data class object currently loaded in said embedded device;

a data class loader method which loads a data class received from said client via said interface, creates a new data class object for said data class, stores said new data class object in said data cache, and adds a new entry to said data class list to identify said new data class object as being a currently loaded data class object that is currently loaded in said embedded device; and a data class instance list having entries each entry comprising an instance identifier which identifies a data object, said data object being an instance of one of said currently loaded data class objects that is currently loaded in said embedded device.

2. A data manager in accordance with claim 1, comprising:

a data object creation method which creates a new instance of one of said currently loaded data class objects identified in said data class list and adds a new instance identifier which identifies said new instance to said data class instance list.

3. A data manager in accordance with claim 2, comprising:

a get data method which is responsive to an instance identifier argument to retrieve data associated with said data class object instance that is identified by said instance identifier argument, wherein said instance identifier argument comprises one of said instance identifiers existing in said data class instance list.

4. A data manager in accordance with claim 2, comprising:

a put data method which is responsive to an instance identifier argument and a data value to set said data associated with said data class object instance that is identified by said instance identifier argument to said data value, wherein said instance identifier argument comprises one of said instance identifiers existing in said data class instance list.

5. A data manager in accordance with claim 1, comprising:
an unload method which is responsive to a data class identifier argument to remove said data class object identified by said data class identifier argument from said data cache and to remove said data class identifier argument from said data class list, wherein said data class identifier argument comprises one of said data class identifiers existing in said data class list.

6. A data manager in accordance with claim 5, comprising:
a memory management handler responsive to a detection of a low- or out-of-memory condition which selects one of said data class objects cached in said data cache to be unloaded, and causes said selected data class object to be unloaded from said data cache.

7. A data manager in accordance with claim 1, wherein:
said data class instance list is distributed across and stored within each of said data class objects identified in said data class list such that each data class object maintains only that portion of said data class instance list that contains data class instance identifiers identifying data class instances of a class defined by said corresponding data class object.

8. An embedded device, comprising:
a hardware independent processor which processes code written in a hardware independent language, said hardware independent processor installed and running on said embedded device;
an interface for communicating with a client;
a data cache for storing global data objects;
a data manager comprising:
 a data class list having entries each entry of which identifies a data class object currently loaded in said embedded device;
 a data class instance list having entries each entry comprising an instance identifier which identifies a data object, said data object being an instance of one of said currently loaded data class objects; and
 a data class loader method which loads a data class received from said client via said interface, creates a new data class object for said data class, stores said new data class object in said data cache, and adds a new entry to said data class list to identify said new data class object as being loaded in said data cache.

9. An embedded device in accordance with claim 8, wherein:
said data manager comprises:
 a data object creation method which creates a new instance of one of said currently loaded data class objects identified in said data class list and adds a new instance identifier which identifies said new instance to said data class instance list.

10. An embedded device in accordance with claim 9, wherein:
said data manager comprises:
 a get data method which is responsive to an instance identifier argument to retrieve data associated with said data class object instance that is identified by said instance identifier argument, wherein said instance identifier argument comprises one of said instance identifiers existing in said data class instance list.

11. An embedded device in accordance with claim 9, wherein:
said data manager comprises:
 a put data method which is responsive to an instance identifier argument and a data value to set said data associated with said data class object instance that is identified by said instance identifier argument to said data value, wherein said instance identifier argument comprises one of said instance identifiers existing in said data class instance list.

12. An embedded device in accordance with claim 8, wherein:
said data manager comprises:
 an unload method which is responsive to a data class identifier argument to remove said data class object identified by said data class identifier argument from said data cache and to remove said data class identifier argument from said data class list, wherein said data class identifier argument comprises one of said data class identifiers existing in said data class list.

13. An embedded device in accordance with claim 8, comprising:
a memory management handler responsive to a detection of a low- or out-of-memory condition which selects one of said data class objects cached in said data cache to be unloaded, and causes said selected data class object to be unloaded from said data cache.

14. A method for managing data in an embedded device, said embedded device comprising a data cache for storing data, a data class list for storing data class entries each comprising an identifier which identifies a data class currently loaded in said data cache; and a data class instance list having data class instance entries each comprising an instance identifier which identifies a data object, said data object being an instance of one of said currently loaded data class objects, comprising the steps of:
loading a data class into said data cache;
adding an identifier which identifies said data class to said data class list;
creating a new instance of one of said data classes currently loaded in said data class;
loading said new instance into said data cache; and
adding a new instance identifier which identifies said new instance to said data class instance list.

15. A method in accordance with claim 14, comprising the steps of:
retrieving data from one of said data class object instances that is identified in said data class instance list.

16. A method in accordance with claim 14, comprising the steps of:
obtaining a data value;
setting a data class object instance that is identified in said data class instance list to said data value.

17. A method in accordance with claim 14, comprising the steps of:
removing a data class object from said data cache; and
removing said data class identifier which identifies said data class object from said data class list.

* * * * *